UNITED STATES PATENT OFFICE.

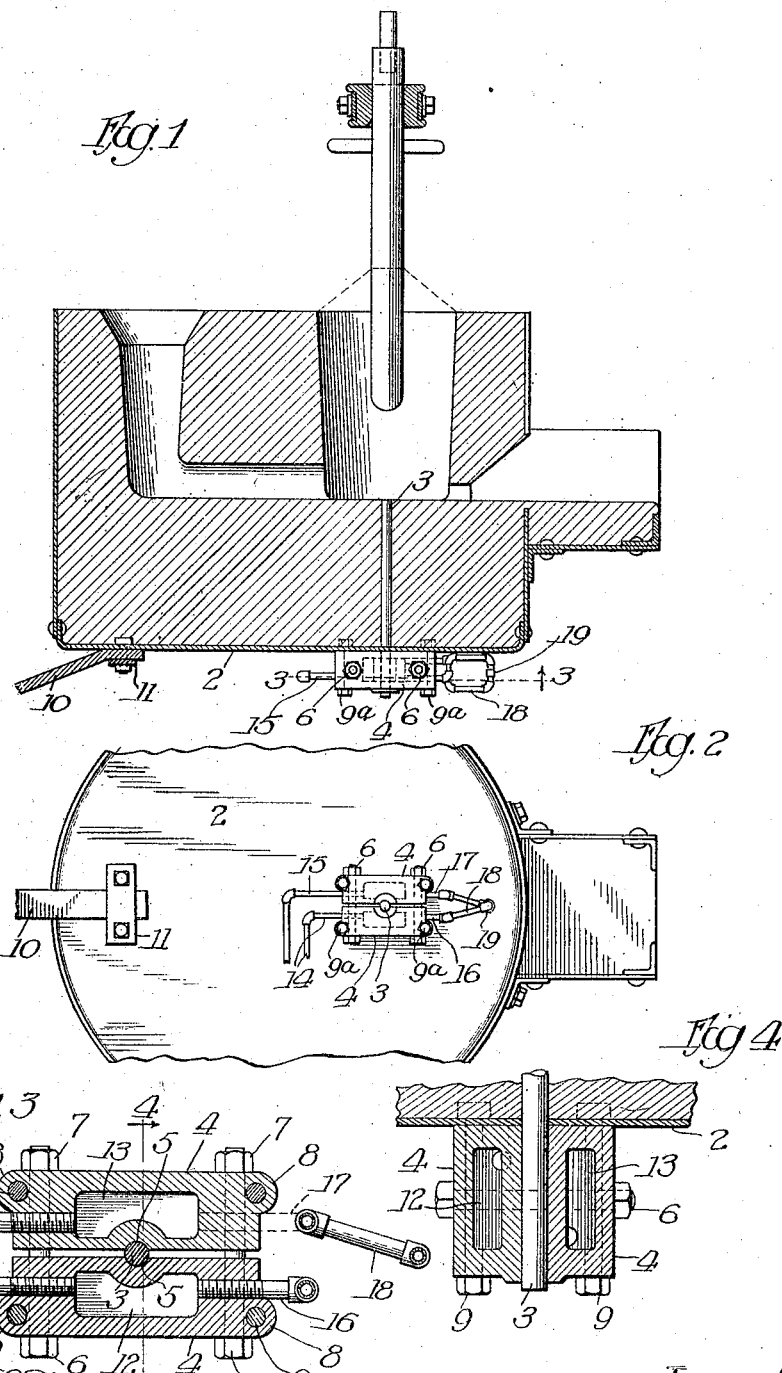

FREDERICK T. SNYDER, OF OAK PARK, ILLINOIS.

ELECTRODE-HOLDER.

1,041,689.  Specification of Letters Patent.  Patented Oct. 15, 1912.

Application filed April 17, 1911. Serial No. 621,486.

*To all whom it may concern:*

Be it known that I, FREDERICK T. SNYDER, citizen of the United States, residing at Oak Park, in the county of Cook and State of Illinois, have invented a certain new and useful Improvement in Electrode-Holders, of which the following is a full, clear, concise, and exact description.

My invention relates to electric furnaces, and more particularly to electrode holders.

Its object is to provide an electrode holder which can be readily secured to the exterior casing or shell of the furnace, which will provide good electrical connection between the electrode and the ground connection therefor and suitable means for cooling the electrode, and which will also provide means whereby the electrode may be quickly and easily secured in position or be removed from the furnace.

In a well known type of electric furnace, the negative electrode extends vertically through the cover of the furnace, the bottom of the furnace being provided with an opening for receiving the bottom or positive electrode, which latter electrode may consist in part of the molten material treated in the furnace, the lower end of the bottom electrode extending through the wall of the furnace and being held in place and cooled in some suitable manner. It is the object of my invention to provide means for holding, cooling and grounding the bottom electrode of electric furnaces of the type described.

One feature of my invention relates to the mounting of the electrode holder upon the wall or metallic shell of the furnace.

A further feature of my invention relates to the arrangement for providing a ground connection for the electrode holder.

Still another feature of my invention relates to the particular structure of the holder, whereby the electrode may be readily clamped or unclamped thereby and at the same time cooled in an efficient manner.

These and other features of my invention may be more readily understood by reference to the accompanying drawings, in which—

Figure 1 is a central vertical section of an electric furnace embodying my invention; Fig. 2 is a bottom plan view of the furnace shown in Fig. 1, with parts broken away; Fig. 3 is an enlarged central longitudinal section through the electrode holder on the line 3, 3 of Fig. 1; and Fig. 4 is a section on the line 4, 4 of Fig. 3.

Similar reference characters refer to similar parts throughout the several views.

Referring to the drawings, the lower wall or bottom of the furnace is of the usual construction, comprising masonry inclosed by a metallic shell or casing 2, preferably of copper; said wall or bottom of the furnace being provided with an opening for the reception of the bottom electrode 3. Mounted upon the bottom of the furnace about said opening and detachably secured to the shell 2 is the electrode holder, which preferably consists of two clamping jaws 4, 4, provided upon their meeting faces with semicircular grooves 5 for receiving the electrode 3. Said jaws are adapted to be clamped securely about the electrode 3 by the clamping bolts 6, 6 and the nuts 7, 7. At its four corners the electrode holder is provided with lugs 8 for the reception of bolts 9, whereby the holder may be bolted to the wall of the furnace and, by tightening the nuts $9^a$, may be drawn into close contact with the shell 2. The jaws 4 of the holder are preferably made of bronze or other suitable conducting material, and the shell 2 is preferably made of copper. By thus bolting the holder to the shell 2, good electric contact is provided between the shell 2 and the electrode holder. Heretofore it has been customary to ground the holder by a flexible conductor secured thereto.

In the preferred embodiment of my invention, as shown in the drawings, the flexible ground connection 10 is clamped by the plate 11, or in any suitable manner, to the shell 2 near the circumference thereof. The flexible conductor 10 being thus connected to the shell 2 is out of the way and is not disturbed in the act of adjusting the electrode holder to remove one electrode from the holder and substitute another therefor. When the electrode is in position the ground connection for the material in the furnace extends through the electrode 3, the clamping jaws 4, the metallic shell 2 and the flexible conductor 10. Each of the jaws 4, 4 are hollow, thereby providing water chambers 12, 13. Water is circulated through the chambers 12, 13. At one end the holder jaws are provided with inlet and outlet water pipes 14 and 15, respectively, and at the opposite end with pipes 16 and 17. Connecting the pipes 16 and 17 is a pipe coupling 18, formed in two sections connected by a union 19. One section of the coupling 18 extends upwardly from the pipe 16, then horizontally and then downwardly to the union 19. The other section of the coupling 18, extends downwardly from the pipes 17, then horizontally and then upwardly to the union 19. This structure of pipe coupling readily permits the jaws 4, 4 being drawn together, by tightening the nuts 7, or drawn apart, by loosening the nuts 7, sufficiently to clamp or release the electrode 3, the coupling 18 being flexible to such an extent as not to interfere with such operation. By slightly loosening the nuts 9ª, the clamping jaws 4 may, upon likewise loosening the nuts 7, be drawn sufficiently apart to release the electrode 3 and to permit of the removal of one electrode and the substitution of another therefor. The electrode holder is thus of such construction and is so mounted on the wall of the furnace that its jaws can be operated without disconnecting the holder from the wall upon which it is mounted.

What I claim is:

1. The combination with an electric furnace provided with an electrode extending through the wall thereof, of a water-cooled electrode-holder provided with opposed clamping jaws for engaging said electrode, bolts extending from said wall through said clamping jaws, and nuts engaging the ends of said bolts, substantially as described.

2. The combination with an electric furnace having a wall composed of masonry and an exterior metallic shell, said wall being provided with an opening from the interior to the exterior of the furnace for the reception of an electrode, of a metallic electrode holder mounted on said wall about said opening in electrical contact with said shell, and a conductor secured to said shell, whereby said electrode, holder, shell and conductor constitute a portion of an electric circuit.

3. An electrode holder comprising two opposed hollow clamping jaws, clamping bolts at the opposite ends of said electrode-holder for adjusting the clamping engagement of said jaws, and means for circulating a cooling fluid through said hollow jaws, said latter means comprising a flexible pipe-coupling connecting the chambers in said hollow jaws, an inlet pipe to the chamber in one of said jaws and an outlet pipe from the chamber in the other of said jaws.

4. The combination with an electric furnace provided with a bottom electrode extending through the bottom wall of said furnace; of an electrode holder comprising two opposed hollow clamping jaws, means for adjusting said jaws and means for circulating a cooling fluid through said hollow jaws; and means for adjustably mounting said electrode holder on said bottom wall to permit of the adjustment of said jaws without detaching said holder from the furnace.

In witness whereof, I hereunto subscribe my name this 12th day of April, A. D., 1911.

FREDERICK T. SNYDER.

Witnesses:
ALFRED H. MOORE,
McCLELLAND YOUNG.